United States Patent
Blignaut (10) Patent No.: US 9,604,539 B1
(45) Date of Patent: Mar. 28, 2017

(54) AUTOSTOP SAFETY SYSTEM

(71) Applicant: Lourens Blignaut, Regina (CA)

(72) Inventor: Lourens Blignaut, Regina (CA)

( * ) Notice: Subject to any disclaimer, the term of this patent is extended or adjusted under 35 U.S.C. 154(b) by 0 days.

(21) Appl. No.: 14/794,816

(22) Filed: Jul. 9, 2015

Related U.S. Application Data (60) Provisional application No. 62/022,306, filed on Jul. 9, 2014.

(51) Int. Cl.
| | | |
|---|---|---|
| *G06F 17/00* | (2006.01) | |
| *B60K 28/04* | (2006.01) | |
| *B60W 10/04* | (2006.01) | |
| *B60W 40/08* | (2012.01) | |
| *B60W 10/10* | (2012.01) | |
| *B60W 30/188* | (2012.01) | |

(52) U.S. Cl.
CPC ............ *B60K 28/04* (2013.01); *B60W 10/04* (2013.01); *B60W 10/10* (2013.01); *B60W 30/188* (2013.01); *B60W 40/08* (2013.01); *B60W 2040/0881* (2013.01); *B60W 2510/18* (2013.01); *B60W 2510/20* (2013.01); *B60W 2520/10* (2013.01); *B60W 2710/06* (2013.01)

(58) Field of Classification Search
None
See application file for complete search history.

(56) References Cited

U.S. PATENT DOCUMENTS

| | | | | |
|---|---|---|---|---|
| 3,500,946 A | * | 3/1970 | Boyajian | B60K 28/04 180/273 |
| 4,369,745 A | * | 1/1983 | Howard | B60K 28/00 123/198 DC |
| 4,381,042 A | * | 4/1983 | Perry | B60K 28/04 180/272 |
| 5,706,909 A | | 1/1998 | Bevins | |
| 6,457,545 B1 | * | 10/2002 | Michaud | B60K 28/04 180/272 |
| 6,952,161 B1 | | 10/2005 | Williams | |
| 8,485,301 B2 | | 7/2013 | Grubaugh | |
| 8,874,301 B1 | * | 10/2014 | Rao | B60K 28/066 180/272 |
| 2004/0055558 A1 | * | 3/2004 | McElroy | B60K 28/04 123/198 DC |

\* cited by examiner

*Primary Examiner* — Dirk Wright
(74) *Attorney, Agent, or Firm* — RG Patent Consulting, LLC; Rachel Gilboy

(57) ABSTRACT

An apparatus designed to be used in vehicles with automatic transmissions, to cause the engines to stall or cut-off if the driver leaves the vehicle while it is in drive or reverse. The apparatus features a sensor in a driver's seat and a sensor along a brake pedal, both connected to the vehicle's computer system and working in parallel for improving safety of a motorist. When the seat sensor indicates the seat has been vacated, and the brake sensor indicates the driver has removed his or her foot from the brake pedal while the vehicle is in D or R, a signal will be transmitted via the computer system to cut off the engine for improving safety of the motorist by preventing a possible accident.

19 Claims, 5 Drawing Sheets

INSIDE VIEW

FIG. 4

FIG. 5

AUTOSTOP SAFETY SYSTEM

CROSS-REFERENCE TO RELATED APPLICATION

The present application is related to and claims priority from prior provisional application Ser. No. 62/022,306, filed Jul. 9, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of safety systems and more specifically relates to a safety system designed to cause a car with an automatic transmission to stall when it is gear, either D or R, and the driver takes his or her foot off the brake pedal and exits the car. Sensors in the driver's seat and the brake pedal work together and are connected the vehicle's computer to cause the engine to stall so it will not move forward or backward after the driver has left.

2. Description of the Related Art

We have all seen funny videos on YouTube where someone gets out of a car while the engine is running, and the car is in gear (either drive or reverse) ending with catastrophic consequences. The car will continue moving forward or backward after the driver has exited when it is had been left in gear. A car with a standard transmission requires the driver to keep one foot on the clutch and one foot on the brake when it is not moving or it will stall out. There is no such safety system in vehicles with automatic transmissions, and many people have suffered grievous injuries or died as a result. A suitable solution is desirable.

Various attempts have been made to solve the above-mentioned problems such as those found in U.S. Pat. No. 8,485,301 to James Grubaugh, U.S. Pat. No. 5,706,909 to Steven D. Bevins et al, and U.S. Pat. No. 6,952,161 to Joy A. Williams. This art is representative of vehicle safety systems. None of the above inventions and patents, taken either singly or in combination, is seen to describe the invention as claimed.

Ideally, a vehicle safety system should provide a system useful for automatically stalling a motor vehicle when the motor vehicle has been exited by a user and yet remains in drive gear or reverse gear and, yet would operate reliably and be manufactured at a modest expense. Thus, a need exists for a reliable autostop safety system to avoid the above-mentioned problems.

BRIEF SUMMARY OF THE INVENTION

In view of the foregoing disadvantages inherent in the known safety systems art, the present invention provides a novel autostop safety system. The general purpose of the present invention, which will be described subsequently in greater detail, is to provide a safety system designed to cause a car with an automatic transmission to stall when it is gear, either D or R, and the driver takes his or her foot off the brake pedal and exits the car. Sensors in the driver's seat and the brake pedal work together and are connected the vehicle's computer to cause the engine to stall so it will not move forward or backward after the driver has left.

An autostop safety system for use in combination with a computer system of a motor vehicle in a preferred embodiment comprises a driver's seat weight sensor-assembly, a brake pedal engagement detection-assembly, and a steering wheel hand pressure monitor-assembly. The driver's seat weight sensor-assembly comprises a circuit network, the circuit network comprising a circuit sensor, and a plurality of circuit wires structured and arranged to communicate the driver's seat weight sensing-signal to computer system of motor vehicle.

The brake pedal engagement detection-assembly comprises a brake pedal engagement detector, a brake pedal engagement detector-mount, and a brake pedal engagement detector cable. The brake pedal engagement detector cable is structured and arranged to communicate a brake pedal disengagement-signal to computer system of motor vehicle. The steering wheel hand pressure monitor-assembly comprises a steering wheel pressure monitor, a steering wheel pressure monitor-mount, and a steering wheel pressure monitor cord. The steering wheel pressure monitor cord is structured and arranged to communicate a steering wheel pressure-signal to the computer system of motor vehicle.

The driver's seat weight sensor-assembly, the brake pedal engagement detection-assembly, the steering wheel hand pressure monitor-assembly comprise in functional combination the autostop safety system. The driver's seat weight sensor-assembly is preferably integrally installed within a driver's seat of the motor vehicle, wherein the circuit sensor of the circuit network is able to sense a presence of weight on the driver's seat of the motor vehicle. The circuit sensor communicates the driver's seat weight sensing-signal to the computer system of the motor vehicle upon detection of a removal of the presence of the weight.

The brake pedal engagement detection-assembly includes a brake pedal engagement detector, the brake pedal engagement detector-mount useful for mounting the brake pedal engagement detector. The brake pedal engagement detection-assembly in functional combination with the driver's seat weight sensor-assembly and the steering wheel hand pressure monitor-assembly serve to disengage the motor vehicle to enhance safety of an operator by preventing the motor vehicle from operating in drive and alternatively reverse by preventing the motor from running in a compromised condition wherein the operator is not present to perform safe driving maneuvers.

The autostop safety system further comprises a kit including the driver's seat weight sensor-assembly, the brake pedal engagement detection-assembly, the steering wheel hand pressure monitor-assembly, and a set of user instructions.

A method of using an autostop safety system is also disclosed herein and comprises the steps of: step one, installing the driver's seat weight sensor-assembly, the brake pedal engagement detection-assembly, and the steering wheel hand pressure monitor-assembly onto the motor vehicle, step two, sensing the presence of the weight of the user, step three, exiting the motor vehicle, step four, detecting removal of the weight of the user from the driver's seat of the motor vehicle, step five, detecting a transmission gear position as being in the gear comprising drive or the gear comprising reverse, step six, communicating the sensing-signal to the computer system of the motor vehicle upon detection of a removal of the presence of the weight, and step seven, stalling the motor vehicle.

The present invention holds significant improvements and serves as an autostop safety system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, autostop safety system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to vehicle safety systems and more particularly to an autostop safety system as used to provide a safety system designed to cause a car with an automatic transmission to stall when it is gear, either D or R, and the driver takes his or her foot off the brake pedal and exits the car. Sensors in the driver's seat and the brake pedal work together and are connected the vehicle's computer to cause the engine to stall so it will not move forward or backward after the driver has left the vehicle.

Generally speaking, the autostop safety system is designed to be used in vehicles with automatic transmissions, to cause the engines to stall or cut-off if the driver leaves the vehicle while it is in drive or reverse. There is a sensor in the seat and a sensor on the brake pedal, both connected to the vehicle's computer system and working in parallel. When the seat sensor indicates the seat has been vacated, and the brake sensor indicates the driver has removed his or her foot from the brake pedal while the vehicle is in D or R, a signal will be sent via the computer system to cut off the engine. If either the brake or the seat sensors are engaged, the engine will not stall. The system is deactivated as long as the seat sensor indicates there is weight in the driver's seat, and it cannot be activated while the vehicle is being driven.

This system is also connected to the speedometer, and it will be de-activated as soon as the vehicle reaches a certain speed, for example at about 15 km/hour, to safeguard against an accidental activation while driving, should the seat sensor fail for some reason. This will prevent a fatal accident from occurring if the engine suddenly cuts off while driving at a high rate of speed. As a third safeguard against accidental activation while driving, there is a sensor on the steering wheel. When either one or both hands are on the steering wheel, the system is deactivated, and the engine cannot be accidentally cut off. There is a warning light that will come on when a malfunction is detected anywhere in the system, indicating that although the system may be working and the vehicle is drivable, one or more of the sensors is defective and may malfunction.

To protect the automobile industry against litigation, the computer is able to record the time and date that the warning light came on, so a customer driving cannot say that the light never came on and therefore the driver was unaware of a possible malfunction. The AUTOSTOP system may be added to new vehicles with automatic transmissions during manufacturing. An aftermarket device for vehicles already on the road can be developed to serve the same function and to make older vehicles safer as well.

The unique features of this invention will provide the following benefits for all owners and drivers of vehicles with automatic transmissions: Provides a safety system to eliminate the possibility of the vehicle continuing to move forward or backward after the driver has exited, leaving the car in either drive (D) or reverse (R); will save lives and prevent accidents caused by drivers leaving their vehicles in drive or reverse and exiting their vehicles; will eliminate serious injuries that can occur to the exiting driver and anyone standing in the way of the vehicle as it continues to move forward or backward; provides an important safety system, as the engine is stalled and the vehicle will no longer move when the driver exits and removes his or her foot from the brake pedal; and safeguards are included to prevent the accidental activation of this system while the car is being driven faster than 15 km/hr or if the driver has his or her hands on the steering wheel.

Figure 1A:
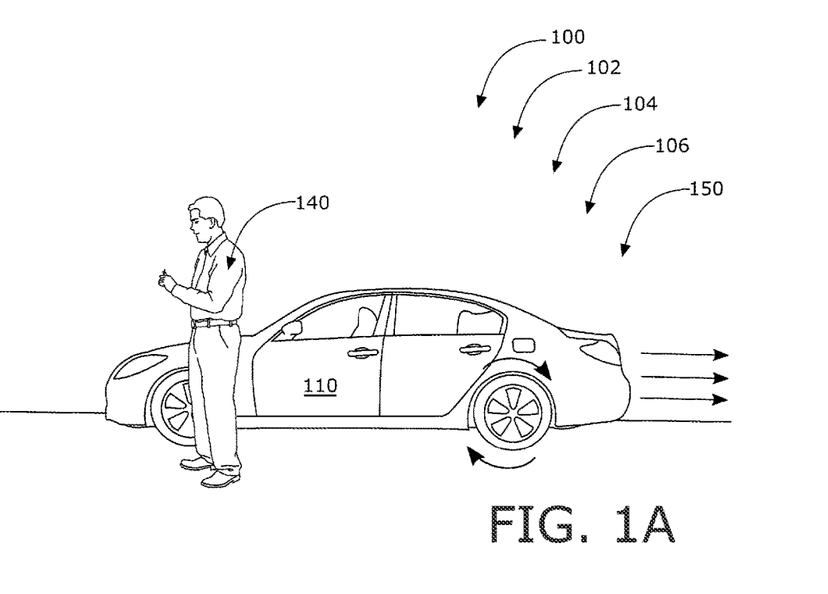
FIG. 1A shows a perspective view illustrating a motor vehicle without an autostop safety system during an 'in-use' condition showing a user unaware that the motor vehicle is moving after the user has exited the motor vehicle according to an embodiment of the present invention.

Referring to the drawings by numerals of reference there is shown in FIG. 1A, a perspective view illustrating motor vehicle 110 without autostop safety system 100 during 'in-use' condition 150 showing user 140 unaware that motor vehicle 110 is moving after user 140 has exited motor vehicle 110 according to an embodiment of the present invention. Autostop safety system 100 for use in combination with computer system 112 of motor vehicle 110 may comprise driver's seat weight sensor-assembly 102, brake pedal engagement detection-assembly 104, and steering wheel hand pressure monitor-assembly 106. Driver's seat weight sensor-assembly 102 may comprise circuit network 115, and plurality of circuit wires 117.

Figure 1B:
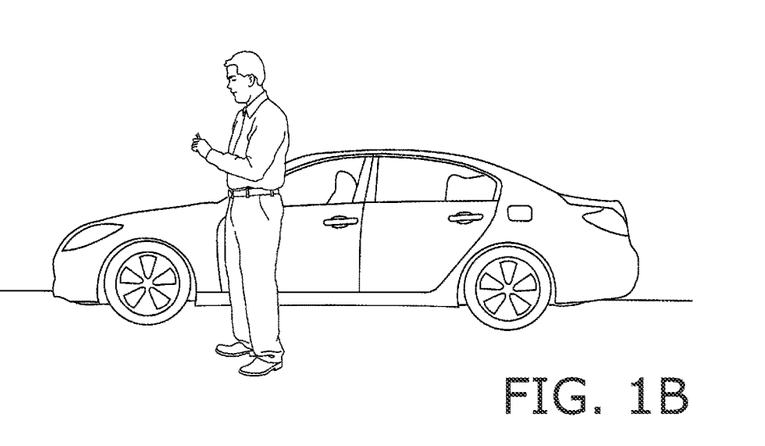
FIG. 1B shows a perspective view illustrating the motor vehicle with an autostop safety system during the 'in-use' condition showing the motor vehicle firmly in place after the user has exited the motor vehicle according to an embodiment of the present invention.

Referring now to FIG. 1B, there is shown a perspective view illustrating motor vehicle 110 with autostop safety system 100 during 'in-use' condition 150 showing motor vehicle 110 firmly in place after user 140 has exited motor vehicle 110 according to an embodiment of the present invention. Driver's seat weight sensor-assembly 102, brake pedal engagement detection-assembly 104, and steering wheel hand pressure monitor-assembly 106 may comprise in functional combination autostop safety system 100. Brake pedal engagement detection-assembly 104 may work in functional combination with driver's seat weight sensor-assembly 102 and steering wheel hand pressure monitor-assembly 106 to disengage motor vehicle 110 to enhance safety of user 140 by preventing motor vehicle 110 from operating in drive and alternatively reverse by preventing the motor from running in a compromised condition wherein user 140 may be not present to perform safe driving maneuvers.

Brake pedal engagement detection-assembly 104 may comprise brake pedal engagement detector 120, brake pedal engagement detector-mount 121, and brake pedal engagement detector cable 122. Brake pedal engagement detector cable 122 may be structured and arranged to communicate brake pedal disengagement-signal 131 to computer system 112 of motor vehicle 110. Steering wheel hand pressure monitor-assembly 106 may comprise steering wheel pressure monitor 125, steering wheel pressure monitor-mount 126, and steering wheel pressure monitor cord 127. Steering wheel pressure monitor cord 127 may be structured and arranged to communicate steering wheel pressure-signal 132 to computer system 112 of motor vehicle 110.

Driver's seat weight sensor-assembly 102 and brake pedal engagement detection-assembly 104 may work in parallel to each other to provide autostop safety system 100 to motor vehicle 110. A transmission of motor vehicle 110 may comprise automatic transmission 170. A transmission of motor vehicle 110 may alternatively comprise non-automatic transmission 172. Autostop safety system 100 may comprise speaker and alarm unit 145. Speaker and alarm unit 145 may be structured and arranged to emit audible alarm 147 upon detection of malfunction of autostop safety system 100.

Figure 2:
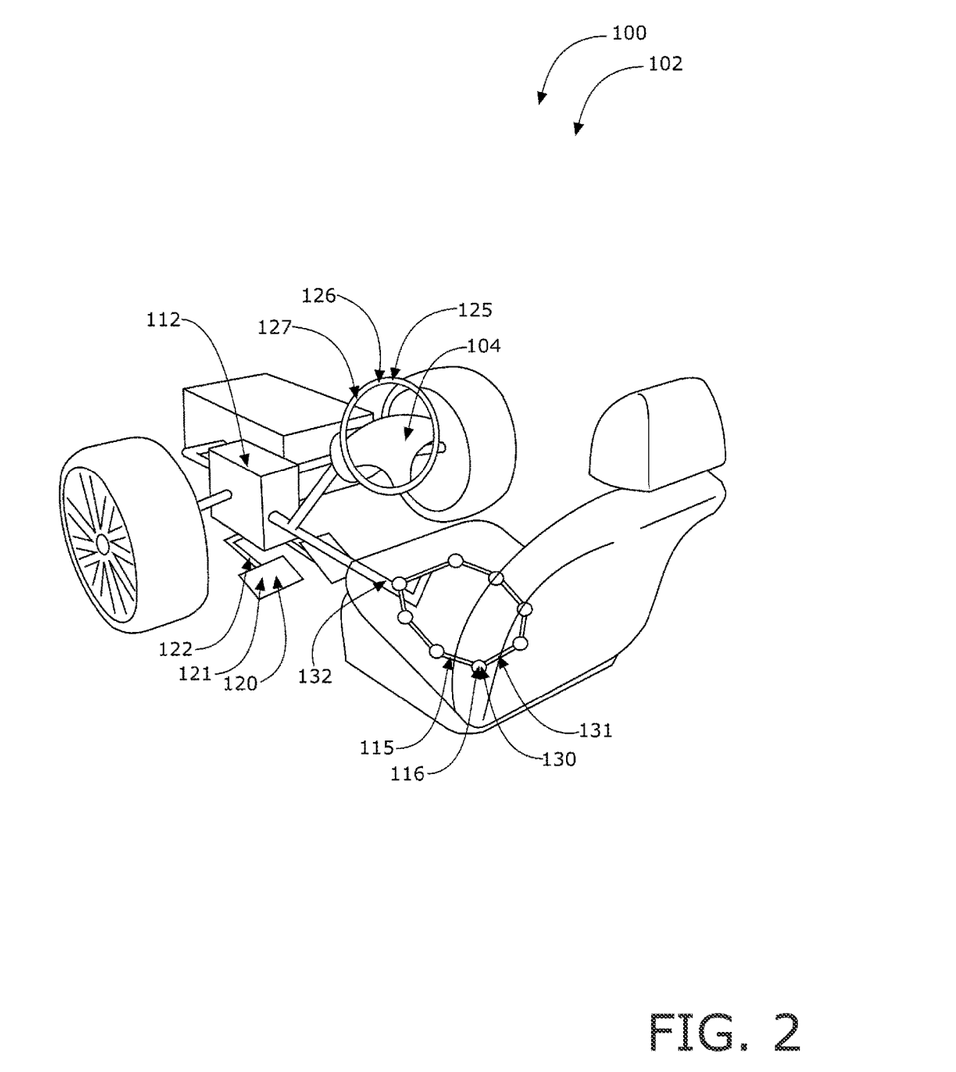
FIG. 2 is an inside view illustrating the autostop safety system installed on the motor vehicle according to an embodiment of the present invention of FIG. 1B.

Referring now to FIG. 2, an inside view illustrating autostop safety system 100 installed on motor vehicle 110 according to an embodiment of the present invention of FIG. 1A. Driver's seat weight sensor-assembly 102 may be integrally installed within a driver's seat of motor vehicle 110. Circuit sensor 116 of circuit network 115 may be able to sense a presence of a weight on the driver's seat of motor vehicle 110, circuit sensor 116 may then communicate driver's seat weight sensing-signal 130 to computer system 112 of motor vehicle 110 upon detection of removal of the presence of the weight of user 140. Brake pedal engagement detection-assembly 104 may include brake pedal engagement detector 120. Brake pedal engagement detector-mount 121 may be useful for mounting brake pedal engagement detector 120.

Driver's seat weight sensor-assembly 102 may be automatically disabled when motor vehicle 110 exceeds a speed of fifteen miles per hour. Driver's seat weight sensor-assembly 102 may be automatically disabled when steering wheel hand pressure monitor-assembly 106 detects the weight of a hand of user 140. Brake pedal engagement detection-assembly 104 may communicate brake pedal disengagement-signal 131 to computer system 112 of motor vehicle 110 upon detection of removal of a foot of user 140 when motor vehicle 110 may be in a gear comprising drive. Brake pedal engagement detection-assembly 104 may communicate brake pedal disengagement-signal 131 to computer system 112 of motor vehicle 110 upon detection of removal of foot of user 140 when motor vehicle 110 may be in a gear comprising reverse.

Figure 3A:
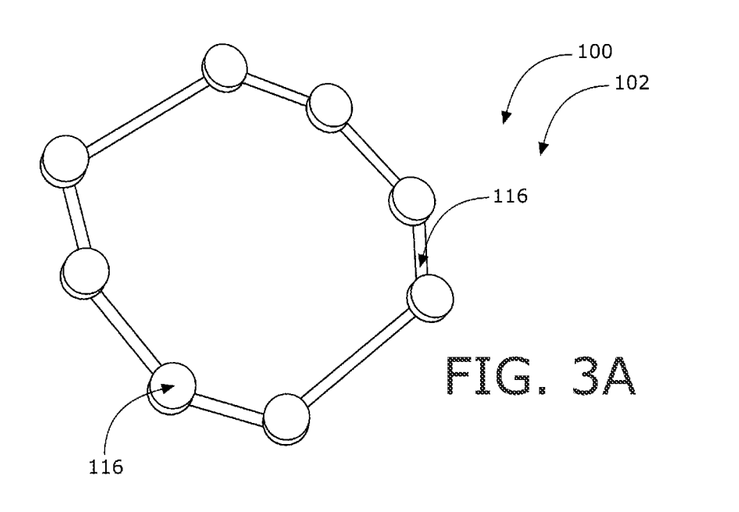
FIG. 3A is a perspective view illustrating a circuit network comprising a plurality of circuit sensors according to an embodiment of the present invention.
Figure 3B:
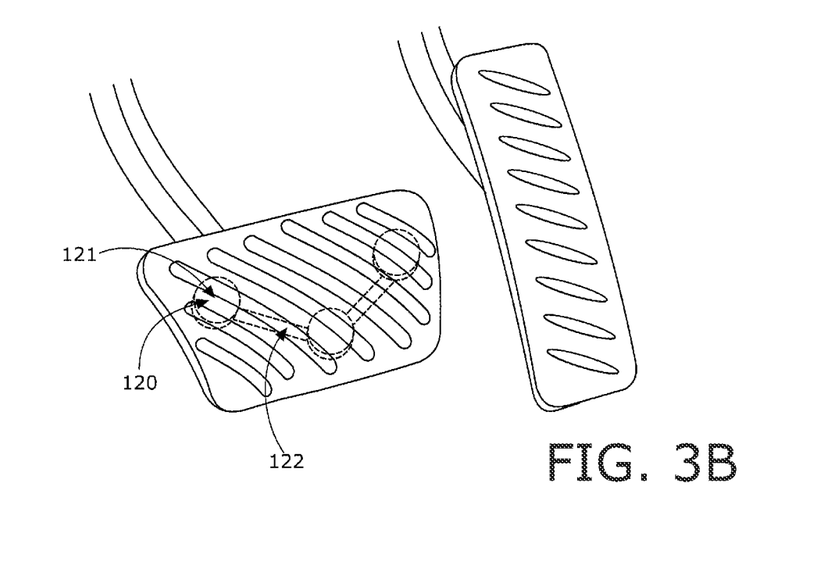
FIG. 3B is a perspective view illustrating a brake pedal engagement detector comprising the circuit network installed on a brake pedal on the motor vehicle according to an embodiment of the present invention

Referring now to FIG. 3A, a perspective view illustrating circuit network 115 comprising a plurality of circuit sensors 116 according to an embodiment of the present invention of FIG. 1A. Circuit network 115 may comprise circuit sensor 116, and plurality of circuit wires 117 may be structured and arranged to communicate driver's seat weight sensing-signal 130 to computer system 112 of motor vehicle 110. FIG. 3B, shows a perspective view illustrating brake pedal engagement detector 120 comprising circuit network 115 installed on a brake pedal on motor vehicle 110 according to an embodiment of the present invention of FIG. 1A.

Figure 4:
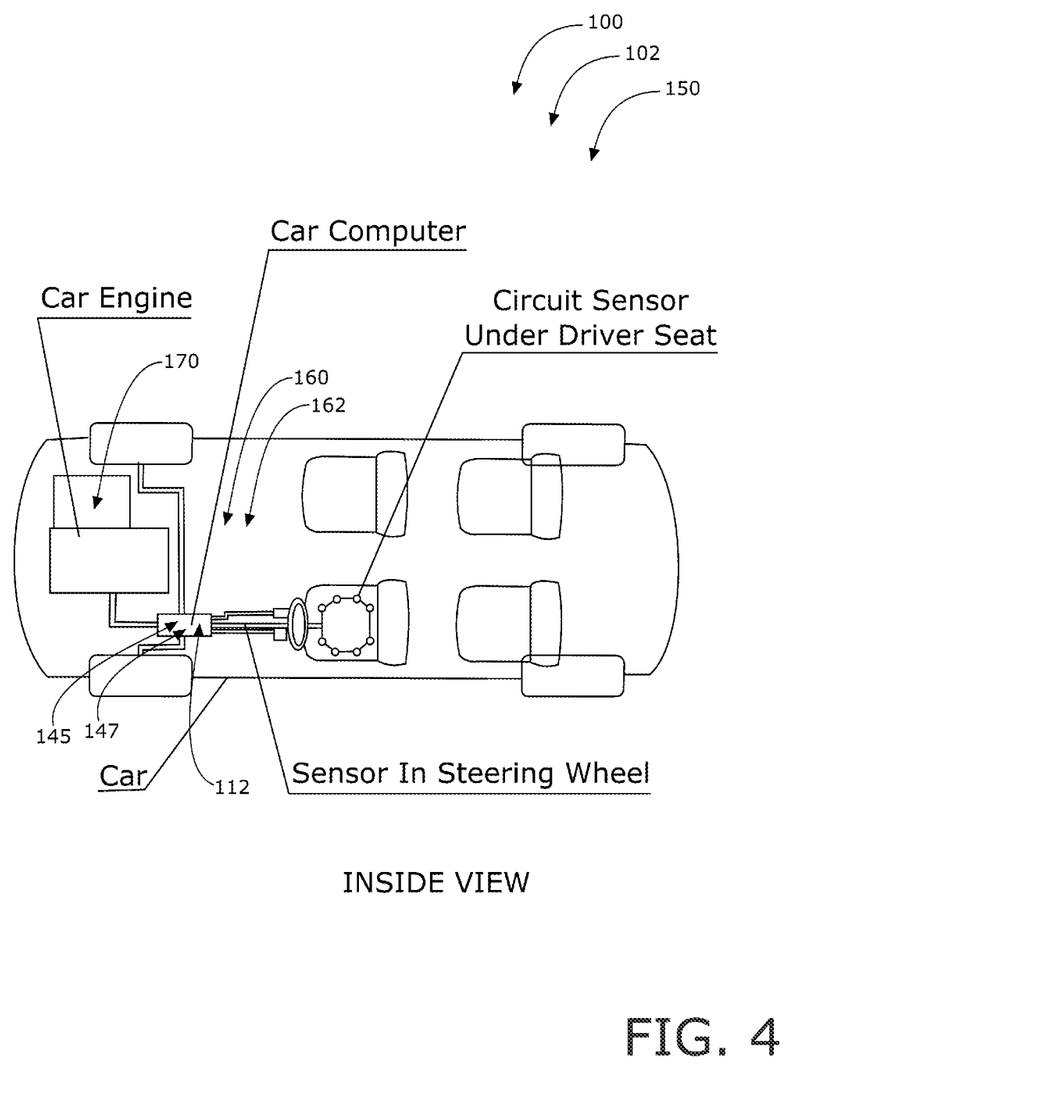
FIG. 4 is a perspective view illustrating the autostop safety system according to an embodiment of the present invention.

Referring now to FIG. 4, a perspective view illustrating autostop safety system 100 according to an embodiment of the present invention of FIG. 1A. Brake pedal engagement detection-assembly 104 may comprise circuit network 115. Brake pedal engagement detector 120 may further comprise circuit sensor 116. Driver's seat weight sensor-assembly 102 may comprise warning light 160. Warning light 160 may illuminate upon detection of a malfunction within autostop safety system 100. Warning light 160 may comprise timestamp 162. Timestamp 162 of warning light 160 may record an exact time and date of a first malfunction warning. Driver's seat weight sensor-assembly 102, brake pedal engagement detection-assembly 104, and steering wheel hand pressure monitor-assembly 106 may be installed within motor vehicle 110 at time after being released from a manufacturing facility.

Autostop safety system 100 may be sold as kit 440 comprising the following parts: driver's seat weight sensor-assembly 102, brake pedal engagement detection-assembly 104, steering wheel hand pressure monitor-assembly 106, and at least one set of user instructions. The kit has instructions such that functional relationships are detailed in relation to the structure of the invention (such that the invention can be used, maintained, or the like in a preferred manner). Autostop safety system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different communication/braking combinations, parts may be sold separately, etc., may be sufficient.

Figure 5:
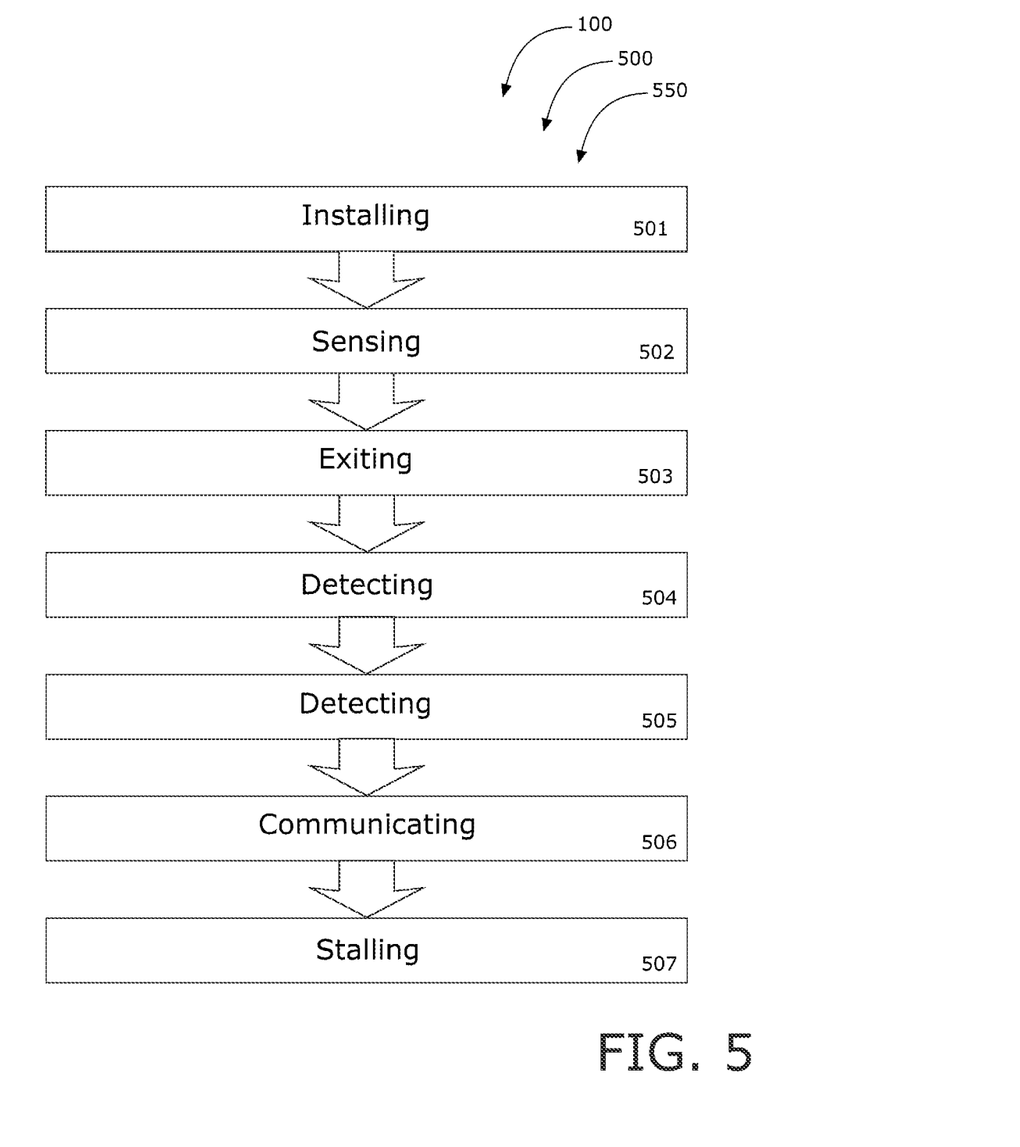
FIG. 5 is a flowchart illustrating a method of use for the autostop safety system according to an embodiment of the present invention of FIGS. 1A-4.

Referring now to FIG. 5, flowchart 550 illustrates method of use 500 for autostop safety system 100 according to an embodiment of the present invention of FIGS. 1A-4. As shown, method of use 500 may comprise the steps of: step one 501, installing driver's seat weight sensor-assembly 102, brake pedal engagement detection-assembly 104, and steering wheel hand pressure monitor-assembly 106 onto motor vehicle 110, step two 502, sensing the presence of the weight of user 140, step three 503, exiting motor vehicle 110, step four 504, detecting removal of the weight of user 140 from the driver's seat of motor vehicle 110, step five 505, detecting a transmission gear position as being in the gear comprising drive or the gear comprising reverse, step six 506, communicating the sensing-signal to computer system 112 of motor vehicle 110 upon detection of a removal of the presence of the weight of user 140, and step seven 507, stalling motor vehicle 110.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An autostop safety system for use in combination with a computer system of a motor vehicle comprising:
   a driver's seat weight sensor-assembly comprising;
      a circuit network, said circuit network comprising at least one circuit sensor; and
      a plurality of circuit wires, said plurality of circuit wires structured and arranged to communicate a driver's seat weight sensing-signal to said computer system of said motor vehicle;
   a brake pedal engagement detection-assembly comprising;
      at least one brake pedal engagement detector;
      at least one brake pedal engagement detector-mount; and
      at least one brake pedal engagement detector cable, said at least one brake pedal engagement detector cable structured and arranged to communicate a brake pedal disengagement-signal to said computer system of said motor vehicle; and
   a steering wheel hand pressure monitor-assembly comprising;
      at least one steering wheel pressure monitor;
      at least one steering wheel pressure monitor-mount; and
      at least one steering wheel pressure monitor cord, said at least one steering wheel pressure monitor cord structured and arranged to communicate a steering wheel pressure-signal to said computer system of said motor vehicle;
   wherein said driver's seat weight sensor-assembly, said brake pedal engagement detection-assembly, said steering wheel hand pressure monitor-assembly comprises in functional combination said autostop safety system;
   wherein said driver's seat weight sensor-assembly is integrally installed within a driver's seat of said motor vehicle;
   wherein said at least one circuit sensor of said circuit network is able to sense a presence of weight on said driver's seat of said motor vehicle;
   wherein said at least one circuit sensor communicates said driver's seat weight sensing-signal to said computer system of said motor vehicle upon detection of a removal of said presence of said weight;
   wherein said brake pedal engagement detection-assembly including said at least one brake pedal engagement detector, said at least one brake pedal engagement detector-mount useful for mounting said at least one brake pedal engagement detector, said brake pedal engagement detection-assembly in functional combination with said driver's seat weight sensor-assembly and said steering wheel hand pressure monitor-assembly serve to disengage said motor vehicle to enhance safety of an operator by preventing said motor vehicle from operating in drive and alternatively reverse by preventing said motor from running in a compromised condition wherein said operator is not present to perform safe driving maneuvers.

2. The autostop safety system of claim 1 wherein said driver's seat weight sensor-assembly is automatically disabled when said motor vehicle exceeds a speed of fifteen miles per hour.

3. The autostop safety system of claim 2 wherein said driver's seat weight sensor-assembly is automatically disabled when said steering wheel hand pressure monitor-assembly detects the weight of at least one hand of said user.

4. The autostop safety system of claim 3 wherein said brake pedal engagement detection-assembly communicates a brake pedal disengagement-signal to said computer system of said motor vehicle upon detection of a removal of a foot of said user when said motor vehicle is in a gear comprising drive.

5. The autostop safety system of claim 4 wherein said brake pedal engagement detection-assembly communicates a brake pedal disengagement-signal to said computer system of said motor vehicle upon detection of a removal of said foot of said user when said motor vehicle is in a gear comprising reverse.

6. The autostop safety system of claim 1 wherein said brake pedal engagement detection-assembly comprises said circuit network.

7. The autostop safety system of claim 6 wherein said at least one brake pedal engagement detector comprises said at least one circuit sensor.

8. The autostop safety system of claim 1 wherein said driver's seat weight sensor-assembly comprises a warning light.

9. The autostop safety system of claim 8 wherein said warning light illuminates upon detection of a malfunction within said autostop safety system.

10. The autostop safety system of claim 9 wherein said warning light comprises a time stamp.

11. The autostop safety system of claim 10 wherein said timestamp of said warning light records an exact time and date of a first malfunction warning.

12. The autostop safety system of claim 11 wherein said driver's seat weight sensor-assembly, said brake pedal engagement detection-assembly, and said steering wheel hand pressure monitor-assembly is installed within said motor vehicle at a time after being released from a manufacturing facility.

13. The autostop safety system of claim 11 wherein said driver's seat weight sensor-assembly and said brake pedal engagement detection-assembly work in parallel to each other to provide said autostop safety system to said motor vehicle.

14. The autostop safety system of claim 13 wherein a transmission of said motor vehicle comprises an automatic transmission.

15. The autostop safety system of claim 13 wherein a transmission of said motor vehicle comprises a non-automatic transmission.

16. The autostop safety system of claim 1 further comprising a speaker and alarm unit.

17. The autostop safety system of claim 16 wherein said speaker and alarm unit is structured and arranged to emit an audible alarm upon detection of a malfunction of said autostop safety system.

18. An autostop safety system for use in combination with a computer system of a motor vehicle comprising:
- a driver's seat weight sensor-assembly comprising;
  - a circuit network, said circuit network comprising at least one circuit sensor; and
  - a plurality of circuit wires, said plurality of circuit wires structured and arranged to communicate a driver's seat weight sensing-signal to said computer system of said motor vehicle;
- a brake pedal engagement detection-assembly comprising;
  - at least one brake pedal engagement detector;
  - at least one brake pedal engagement detector-mount; and
  - at least one brake pedal engagement detector cable, said at least one brake pedal engagement detector cable structured and arranged to communicate a brake pedal disengagement-signal to said computer system of said motor vehicle; and
- a steering wheel hand pressure monitor-assembly comprising;
  - at least one steering wheel pressure monitor;
  - at least one steering wheel pressure monitor-mount; and
  - at least one steering wheel pressure monitor cord, said at least one steering wheel pressure monitor cord structured and arranged to communicate a steering wheel pressure-signal to said computer system of said motor vehicle;
- wherein said driver's seat weight sensor-assembly, said brake pedal engagement detection-assembly, said steering wheel hand pressure monitor-assembly comprises in functional combination said autostop safety system;
- wherein said driver's seat weight sensor-assembly is integrally installed within a driver's seat of said motor vehicle;
- wherein said at least one circuit sensor of said circuit network is able to sense a presence of weight on said driver's seat of said motor vehicle;
- wherein said at least one circuit sensor communicates said driver's seat weight sensing-signal to said computer system of said motor vehicle upon detection of a removal of said presence of said weight;
- wherein said brake pedal engagement detection-assembly including said at least one brake pedal engagement detector, said at least one brake pedal engagement detector-mount useful for mounting said at least one brake pedal engagement detector, said brake pedal engagement detection-assembly in functional combination with said driver's seat weight sensor-assembly and said steering wheel hand pressure monitor-assembly serve to disengage said motor vehicle to enhance safety of an operator by preventing said motor vehicle from operating in drive and alternatively reverse by preventing said motor from running in a compromised condition wherein said operator is not present to perform safe driving maneuvers.

19. The autostop safety system of claim 18 further comprising a kit including:
- said driver's seat weight sensor-assembly;
- said brake pedal engagement detection-assembly;
- said steering wheel hand pressure monitor-assembly; and
- a set of user instructions.

* * * * *